Figure 1:
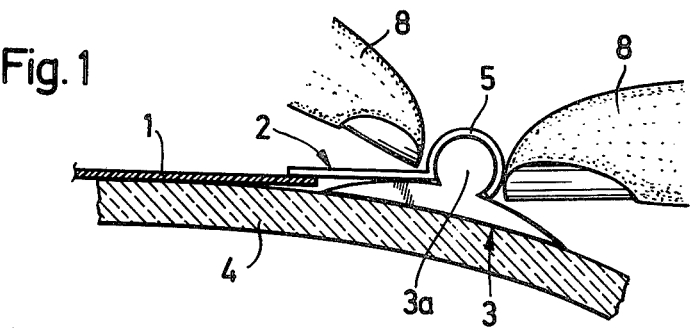

United States Patent [19]

Eichstaedt

[11] 4,181,350
[45] Jan. 1, 1980

[54] PANE COVER DEVICE, PARTICULARLY FOR WINDSHIELDS AND WINDOWS OF MOTOR VEHICLES

[76] Inventor: Wolfgang Eichstaedt, Brunnenweg 18, D-3331 Bad Helmstedt, Fed. Rep. of Germany

[21] Appl. No.: 785,291

[22] Filed: Apr. 6, 1977

[30] Foreign Application Priority Data

Apr. 9, 1976 [DE] Fed. Rep. of Germany ....... 2615567

[51] Int. Cl.² ............................................. B60T 1/20
[52] U.S. Cl. .............................. 296/95 C; 160/368 S
[58] Field of Search ................ 296/95 R, 95 C, 97 R, 296/97 C, 97 D, 81 R; 24/81 AG, 265 C, 279; 160/368 R, 368 S

[56] References Cited

U.S. PATENT DOCUMENTS 3,874,437  11/1973  Black ........................... 296/95 C X
4,025,103   5/1977  Eichstaedt ....................... 296/95 C Primary Examiner—Joseph F. Peters, Jr.
Assistant Examiner—Gene A. Church
Attorney, Agent, or Firm—McCormick, Paulding & Huber

[57] ABSTRACT

A pane cover for automotive windshields and windows comprising a stretchable covering sheet with reinforcing bars at each end. Each bar has a thin flexible channel open inwardly and spaced apart actuating legs projecting outwardly. A pair of mounting ribs on the vehicle mate with the channels in snap engagement with the covering stretched in position therebetween and disengagement of channels and ribs is accomplished by pressing the actuating legs together.

3 Claims, 11 Drawing Figures

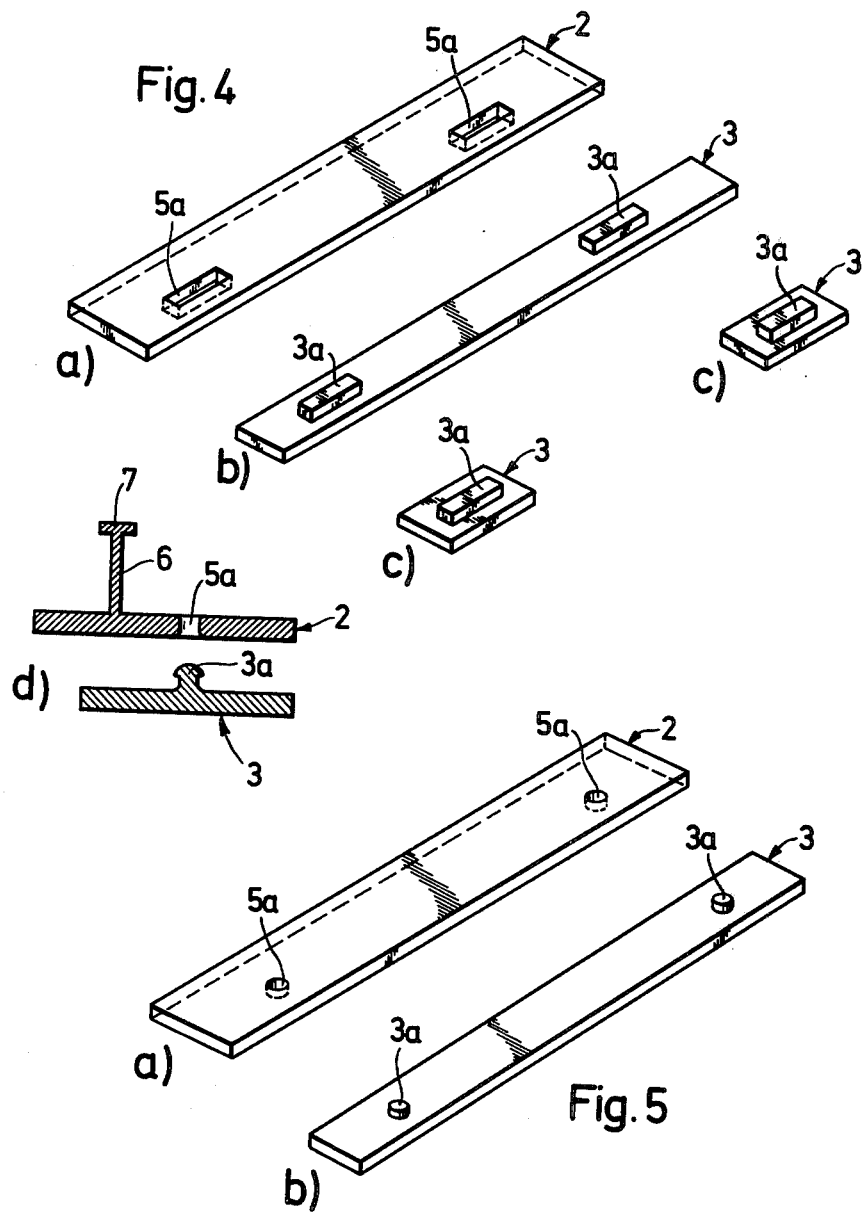

Fig. 6
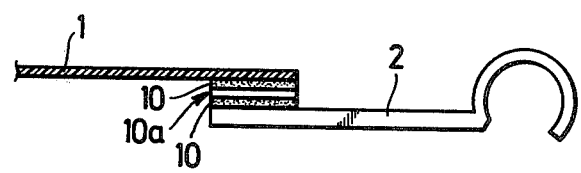
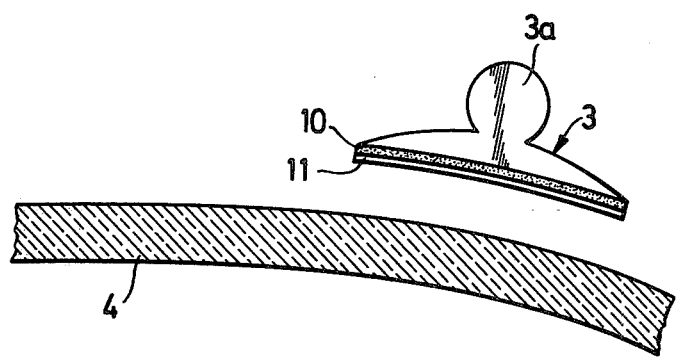
Fig. 7

PANE COVER DEVICE, PARTICULARLY FOR WINDSHIELDS AND WINDOWS OF MOTOR VEHICLES

The invention relates to a pane cover device, particularly for automotive windshields and windows, consisting of a covering sheet of plastic foil, rubber, fabric or any similar substitute, with each one of the two shorter sides of the covering sheet being provided with at least one device to fasten same on the windshield (or window), said covering sheet being of a standard size so as to fit any window glass area shape. The covering sheet will be of minor thickness in order to be easily stretched upon the windshield, each one of the two shorter sides of said covering sheet being provided with at least one reinforcement bar.

My U.S. patent application Ser. No. 517,050 refers to a pane cover device designed aiming at the best technical advantages yet still at low production cost so as to be marketed as a mass consumer item.

The present invention envisages an improved version of the pane cover devices as described in my U.S. patent application Ser. No. 517,050.

As shown on FIGS. 14 thru 16 of my U.S. patent application Ser. No. 517,050 the elevated profiles 7, 8 or 9 of the reinforcement bar 2 engage in the recesses of the matching profiles 7a, 8a, 9a resp. as firmly attached to the windshield.

As an improvement of the above pane cover device, the invention now refers to a design whose profile of the reinforcement bar as attached to the covering sheet is designed in such a manner that it engages in a clamping, hooking or clicking way over a small elevation of the matching profile firmly attached to the windshield or its neighborhood.

A pane cover device accordingly to this invention whose profile of the reinforcement bar engages over the elevation of the matching profile firmly attached to the windshield offers the advantage that—when the cover device is not in position, i.e. particularly when the vehicle is being driven—no dirt, snow or ice will deposit in the groove of the matching profiles, since said groove is transferred to the reinforcement bar. Would the groove be located on the matching profile attached to the windshield, dirt, ice or snow would deposit in the same and would require said profile to be carefully cleaned before the cover device is attached, in order to allow both matching profiles to engage smoothly.

As already outlined in detail in my U.S. patent application Ser. No. 517,050, a cost saving design is one of the basic prerequisites for the device to be marketed as a mass consumption item. In order to fulfill this prerequisite of cost saving, the invention envisages reinforcement bars and matching profiles of the smallest and thinnest possible dimensions, however without prejudicing their functional value or their handiness. As a result of the low dimensions of the matching profile as firmly attached to the windshield, neither the appearance of the vehicle nor the sight of the driver will be affected. Also the profile of low design as attached to the windshield will not offer any major resistance to the brushes of automatic car washing machines and therefore will not be torn off by the latter.

Further developments and practical arrangements of the invention are given in claims 1 thru 3.

Various applications of the invention are shown in the drawings and shall be described in detail as follows.

Figure 2:
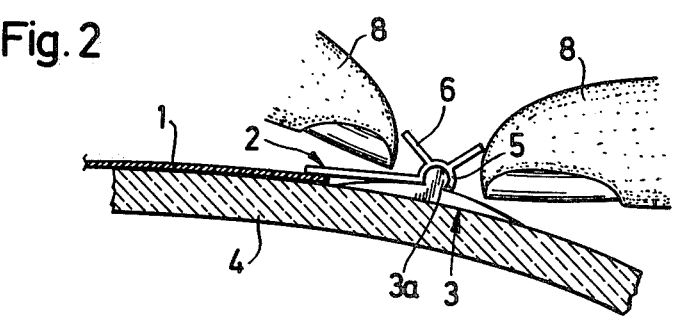

FIG. 1 is a cross-sectional view of a pane cover device attached to a windshield accordingly to the invention FIG. 2 is again a cross-sectional view of a variation of the pane cover device accordingly to the invention FIG. 3 is again a cross-sectional view of a further variation of the pane cover device accordingly to the invention FIG. 4a is a perspective representation of a modified design of the reinforcement bar of a pane cover device accordingly to the invention FIGS. 4b and 4c are perspective representations of matching profiles to the reinforcement bar as shown on FIG. 4a FIG. 4d is a cross-sectional view of another version of the reinforcement bars and the matching counter profiles as basically shown on FIGS. 4a thru 4c FIGS. 5a and 5b are further variations of a reinforcement bar and the matching counter profile FIG. 6 shows an applicational example of attaching the covering sheet to the reinforcement bar, and FIG. 7 shows an applicational example of attaching the counter profile to the windshield FIG. 1 shows a covering sheet 1 as stretched upon a window of a vehicle, for example a windshield, said covering sheet provided with a reinforcement bar 2 carrying a profile 5 opened toward the window of the vehicle. Profile 5 is engaged in a clamping way over the pretuberant part 3a of a matching profile 3 as attached to the windshield. As explained already above, the elevation of the pretuberant part 3a should be minimized, i.e. should be limited to a few millimeters.

Considering the fact that the elevation of the pretuberant part 3a of the matching profile 3 should be limited to, for example, 2 to 3 mm, subsequently the elevation of the profile 5 of the reinforcement bar 2 which engages over the pretuberant part 3a of the matching profile 3 should be limited as well, also once said reinforcement bar should be of as thin a material as possible. As a result, it may be difficult to remove the cover device from the vehicle, because it will not be possible to graps firmly with the fingers the small profile 5 of the reinforcement bar 2. Further, when grasping the profile 5 of the reinforcement bar 2 of thin and flexible material, profile 5 may be pressed still more firmly against the profile 3 as overlapped by the former. As the result, the disengaging and removing of profile 5 of the reinforcement bar 2 from the matching profile 3 may not only be impeded but it may even happen that the profile 3 be torn off the windshield. Therefore, in the applicational version as shown on FIG. 2 the profile 5 of the reinforcement bar 2 is provided with two additional legs 6. With the elevation of profile 5 including legs 6 being—as an example—only approx. 8 mm high, the fingers 8 will not reach and thus will not compress the reinforcement bar 2 in its area 5, but by grasping the profile in the area of legs 6, said profile will be opened in the area overlapping the pretuberant part 3a of the matching profile, due to the transmitted lever action.

As the result, the reinforcement bar 2 will be enabled to disengage from its matching profile 3 with the necessary ease. Also—considering the fact as outlined above that profile 5 of the reinforcement bar 2 should be as low as possible—the increase of total elevation of the reinforcement bar 2 thanks to the legs 6 allows said reinforcement bar to be better grasped by the fingers again.

Figure 3:
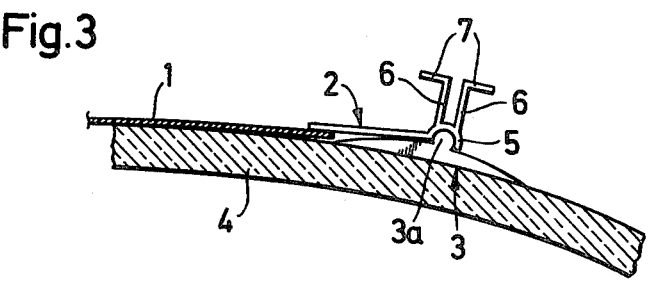

A further improvement of the concept as outlined above is shown on FIG. 3. By a given length of the two legs 6 as well as by the distance between the ends 7 of said legs, the lever action to be exerted upon the profile 5 of the reinforcement bar can be determined as well as limited. As the result, profile 5 is prevented from being broken away or from being permanently deformed, as it may occure by an excess of lever action caused by grasping too strongly the legs 6 from both sides. On the other hand, due to the positioning of the two legs 6 in an almost parallel sense to each other, their lever action is the most efficient one yet under control. In order to allow the reinforcement bar 2 (which may, for example, have a total elevation of only approx. 8 mm—considering profile 5 plus legs 6) to be grasped firmly, it is recommended that the legs 6 be squarred off outwardly in their area 7, as shown on FIG. 3.

FIG. 4 shows a further alternative of the arrangement as shown on FIGS. 14, 15 and 16 of my U.S. patent application Ser. No. 517,050, i.e. a reinforcement bar provided with a special profile engaging a matching profile firmly attached to the vehicle. The reinforcement bar 2 is provided with one or more slits 5a engaging the matching elevations 3a of the counter profile 3 firmly attached to the vehicle. As the result, the reinforcement bar 2 and thus the whole of the pane cover device is held firmly in position on the vehicle. The counter profile 3 may have the full length of the reinforcement bar 2, as shown on FIG. 4b, or it may be of various sectional pieces as shown on FIG. 4c.

FIG. 4d shows a cross-sectional view of said reinforcement bar 2 and its matching counter profile 3. As indicated on FIG. 4d, the engaging effect can be further improved by reducing the thickness of the lower part of the elevation 3a and by giving the slit on profile 5 a complementary design.

Furthermore, the reinforcement bar 2 as shown on FIG. 4d is provided with legs 6 squarred off outwardly on their upper ends 7, in order to allow said reinforcement bar to be easier grasped by the user's fingers although for cost saving reasons the reinforcement bar should be of very thin and low design.

Another alternative of the design as shown on FIGS. 4a and 4b is given on FIGS. 5a and 5b, with the slits 5a being replaced by round holes and the elevations 3a being round pins.

In all applications of the invention as outlined above the counter profile 3 whose elevations 3a engages the profile of the reinforcement bar in a clicking, hooking or clamping way—instead of being attached to the windshield or in its neighborhood—can be already worked into a component of the vehicle itself, such as the windshield itself, or the rubber fitting envolving the windshield, or the chrome moulding envolving the windshield and the fitting, or worked into the car body itself in the area close to the windshield or other windows, with said body parts being usually made of steel or other material.

An alternative of attaching the covering sheet 1 to the reinforcement bar 2 is shown on FIG. 7. The reinforcement bar 2 is in its attachment area provided with double sided pressure sensitive adhesive tape 10a carrying pressure sensitive adhesive films 10. This allows the covering sheet—once adjusted to the right size as related to the windshield of the vehicle—to be attached firmly to the reinforcement bar 2 in a "do-it-yourself" way by simply pressing the cover sheet against the adhesive tape 10a, i.e. against the pressure sensitive adhesive film 10. As the result, the inconvenient procedure of gluing or welding is avoided.

In a similar approach, i.e. by means of pressure sensitive adhesive tape, the attachment of the counter profile 3 to the windshield 4 of the vehicle may be attained. The approach is shown on FIG. 8, yet including already a further important improvement: if the counter profile 3 is made of material of the proper flexibility allowing the area of the counter profile to be bound to the windshield to adjust or conform itself easily to any shape of the latter, the profile 3 itself may assume the function of the carrier tape of a double sided pressure sensitive adhesive tape. As shown on FIG. 8, the only thing then needed is to apply directly on the profile 3 one single transfer film 10 of pressure sensitive adhesive together with the protectional paper 11. The adhesive film 10 will then stick firmly on the profile 3. Later on the impregnated protective paper 11 adhering only slightly to the adhesive film 10 may be easily removed, yet the latter sticks firmly to profile 3 thus providing the self adhesive layer needed to attach the profile 3 firmly to the windshield 4. As the result, a full adhesive tape is no longer needed, because the carrier tape and one adhesive layer are eliminated, thus allowing lower production costs. Furthermore the danger of the profile 3 be torn off the windshield because of a rupturing carrier tape 10 is eliminated.

The approach of eliminating the carrier tape of an adhesive tape by applying directly a transfer adhesive film may also be used with regard to attaching the covering sheet 1 to the reinforcement bar 2. In this case the elasticity (i.e. the property of adjusting itself to the surface) as provided by the carrier tape of a common adhesive tape is given by the covering sheet to be pressed against the reinforcement bar, rather than by the reinforcement bar itself.

The invention is not limited to the applicational forms as described above and shown in the drawings. For the expert many possibilities of deviations and improvements may arise from the invention. It is also clear that the pane cover can be used on all types of panes, in other words its application is not limited to motor vehicle windshields only.

What is claimed is:

1. A pane cover for windshields and windows of motor vehicles comprising a covering sheet, at least one reinforcing bar attached at each of two opposite ends of said sheet, each reinforcing bar extending along the length of its corresponding sheet end and having a thin flexible channel facing inwardly toward the glass and having a mouth portion narrower than an interior portion, and each channel having a pair of outwardly projecting spaced apart actuating legs extending along its length, said legs having inner edges connected and formed integrally with the back of the channel so as to have a lever action when manually pressed together along their outer edges whereby to open said channel mouth portion, said legs when released manually allowing the mouth portion to close, and a pair of mounting strips attached to the motor vehicle in spaced relationship for cooperation with the channels of the reinforcing bars whereby to hold the covering sheet in position over the pane, each mounting strip having an outwardly facing rib for engagement with a channel, and each rib having an inner portion narrower than an outer portion to provide for snap engagement of channels and ribs with legs manually released, disengagement of said channels and ribs being achieved by pressing said legs together as aforesaid.

2. A pane cover as set forth in claim 1 wherein said legs are spaced apart a limited distance so as to engage each other and limit lever action on the channel portion.

3. A pane cover as set forth in claim 1 wherein each leg has a lateral projection at its free end, said projections extending in opposite directions on the legs of each pair.

* * * * *